(12) United States Patent
Gorenflo et al.

(10) Patent No.: US 10,168,199 B2
(45) Date of Patent: Jan. 1, 2019

(54) METHOD FOR ASCERTAINING AND MONITORING FILL LEVEL OF A MEDIUM IN A CONTAINER USING A TRAVEL TIME MEASURING METHOD

(71) Applicant: Endress + Hauser GmbH + Co. KG, Maulburg (DE)

(72) Inventors: Stefan Gorenflo, Hausen (DE); Stefan Markoni, Rheinfelden (DE); Benjamin Monse, Vogtsburg (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 94 days.

(21) Appl. No.: 14/906,163

(22) PCT Filed: Jun. 2, 2014

(86) PCT No.: PCT/EP2014/061372
§ 371 (c)(1),
(2) Date: Jan. 19, 2016

(87) PCT Pub. No.: WO2015/010814
PCT Pub. Date: Jan. 29, 2015

(65) Prior Publication Data
US 2016/0153822 A1    Jun. 2, 2016

(30) Foreign Application Priority Data
Jul. 23, 2013   (DE) .......................... 10 2013 107 847

(51) Int. Cl.
*G01F 23/296*   (2006.01)
*G01F 23/00*    (2006.01)
*G01F 23/284*   (2006.01)

(52) U.S. Cl.
CPC ...... *G01F 23/2962* (2013.01); *G01F 23/0061* (2013.01); *G01F 23/296* (2013.01); *G01F 23/284* (2013.01)

(58) Field of Classification Search
CPC ............ G01F 23/0061; G01F 23/0069; G01F 23/284; G01F 23/2962
See application file for complete search history.

(56) References Cited

U.S. PATENT DOCUMENTS 3,821,767 A    6/1974  Plummer
6,531,977 B2 *  3/2003  McEwan ............... G01F 23/284
                                                    342/124

(Continued)

FOREIGN PATENT DOCUMENTS

CN    101573596 A    11/2009
CN    102812337 A    12/2012

(Continued)

OTHER PUBLICATIONS

Wu, Ke-Li and McDonald, Gordon. "Coping with hidden spurious harmonic modes in the design of low pass corrugated waveguide filters." Microw. J. 44.11 (2001): 180-183.*

(Continued)

*Primary Examiner* — Lisa M Caputo
*Assistant Examiner* — Punam P Roy
(74) *Attorney, Agent, or Firm* — Bacon & Thomas, PLLC (57) ABSTRACT

In a method for ascertaining and monitoring fill level of a medium in a container by means of a field device using a travel time measuring method, wherein transmission signals are transmitted toward the medium and reflection signals are received; the received reflection signals are registered as echo signals in an echo function, or envelope curve, dependent on travel time or travel distance; by means of an echo search algorithm, at least one wanted echo signal is ascer- (Continued)

tained in the echo function, or envelope curve; by means of at least one filter with filter parameters the echo function, or the envelope curve, is preprocessed; at least a first filter range with a first width is predetermined at the position of the wanted echo signal in the echo function, or in the envelope curve, and at least three filter ranges are formed in the echo function, or in the envelope curve.

10 Claims, 4 Drawing Sheets

(56) References Cited

U.S. PATENT DOCUMENTS

| | | | |
|---|---|---|---|
| 7,965,087 B2 | 6/2011 | Reimelt et al. | |
| 8,159,386 B2 | 4/2012 | Malinovskly et al. | |
| 8,843,329 B2 | 9/2014 | Griessbaum et al. | |
| 2006/0137446 A1* | 6/2006 | Wennerberg | G01F 23/284 73/290 V |
| 2009/0302868 A1 | 12/2009 | Feucht et al. | |
| 2010/0182190 A1* | 7/2010 | Spanke | G01F 23/284 342/124 |

FOREIGN PATENT DOCUMENTS

| | | |
|---|---|---|
| DE | 102005063079 A1 | 7/2007 |
| DE | 102006019191 A1 | 10/2007 |
| DE | 102007034336 A1 | 1/2009 |
| DE | 102009001010 A1 | 7/2010 |
| EP | 2093546 A1 | 8/2009 |
| EP | 2226615 A1 | 9/2010 |
| EP | 2365302 A1 | 9/2011 |
| WO | 2007077079 A1 | 7/2007 |

OTHER PUBLICATIONS

English Translation of International Preliminary Report on Patentability, WIPO, Geneva, dated Feb. 4, 2016.
International Search Report,, EPO, The Netherlands, dated Sep. 5, 2014.
German Search Report, German PTO, Munich, dated Mar. 26, 2014.

* cited by examiner

METHOD FOR ASCERTAINING AND MONITORING FILL LEVEL OF A MEDIUM IN A CONTAINER USING A TRAVEL TIME MEASURING METHOD

TECHNICAL FIELD

The present invention relates to a method for ascertaining and monitoring fill level of a medium in a container using a travel time measuring method.

BACKGROUND DISCUSSION

Such methods for ascertaining and monitoring fill level in a container are frequently applied in measuring devices of automation and process control technology. Such fill level measuring devices are produced and sold by the applicant, for example, under the marks, PROSONIC, LEVELFLEX and MICROPILOT. These devices work using the travel time measuring method and serve to determine and/or to monitor a fill level of a medium in a container. These fill level measuring devices transmit a periodic transmission signal in the microwave or ultrasonic range by means of a transmitting/receiving element in the direction of a surface of a fill substance and receive the reflected echo signals after a distance dependent travel time. Usual fill level measuring devices working with microwaves can be basically divided into two classes; a first class, in the case of which the microwaves are sent by means of an antenna toward the fill substance, reflected on the surface of the fill substance and then received back after a distance dependent travel time and a second class, in the case of which the microwaves are conveyed along a waveguide toward the fill substance, reflected on the surface of the fill substance due to the impedance jump existing there and the reflected waves led back along the waveguide.

Formed from the received echo signals, as a rule, is an echo function representing the echo amplitudes as a function of travel time, wherein each value of the echo function corresponds to the amplitude of an echo reflected at a certain separation from the transmitting element.

In this echo function, a wanted echo is determined, which corresponds to the reflection of the transmission signal on the surface of the fill substance. From the travel time of the wanted echo, there directly results in the case of known propagation velocity of the transmission signals, the separation between the surface of the fill substance and the transmitting element.

In order to simplify the echo curve evaluation, not the received, raw signal of the pulse sequences is used, but, instead, the envelope, the so called envelope curve, is ascertained. The envelope curve is won, for example, by rectifying the raw signal of the pulse sequences and then filtering via a lowpass filter.

There are a large number of different methods for determining the wanted echo in an envelope curve. These methods can be divided basically into two groups, the static detection methods with static echo search algorithms and the dynamic detection methods with dynamic echo search algorithms.

In a first method using a static echo search method, a static echo search algorithm is used to select as wanted echo that echo which has a greater amplitude than the remaining echos. Thus, the echo in the envelope curve with the greatest amplitude is designated the wanted echo.

In a second method using a static echo search method, a static echo search algorithm assumes that the wanted echo is the first echo occurring in the envelope curve after the transmission pulse. Thus, the first echo in the envelope curve is selected as wanted echo.

The two methods can be combined with one another into one static echo search algorithm e.g. by defining a so-called first echo factor. The first echo factor is a predetermined factor, by which an echo must exceed a certain amplitude, in order to be recognized as wanted echo. Alternatively, a travel time dependent echo threshold can be defined, which an echo must exceed, in order to be recognized as wanted echo.

In a third method, the fill-level measuring device is told the current fill level once. The fill-level measuring device can based on the specified fill level identify the associated echo as wanted echo and track such e.g. by a suitable, dynamic, echo search algorithm. Such methods are referred to as echo tracking. In such case, e.g. in each measuring cycle, maxima of the echo signal or the echo function are determined and based on knowledge of the fill level ascertained in the preceding measuring cycle and an application-specific maximum expected rate of change of the fill level, the wanted echo is ascertained. The new fill level then results from a travel time of the so ascertained, current wanted echo.

A fourth method is described in German Patent, DE 102 60 962 A1. There, the wanted echo is ascertained based on earlier data stored in a memory. In such case, from received echo signals, echo functions are derived, which reflect the amplitudes of the echo signals as a function of their travel time. The echo functions are stored in a table, wherein each column serves for accommodating one echo function. The echo functions are stored in the columns in a sequence, which corresponds to the fill levels associated with the respective echo functions. In operation, the wanted echos and the associated fill levels are determined based on the echo functions of the current transmission signals with the assistance the table.

Described in German Patent, DE 103 60 710 A1 is a fifth method, in the case of which periodically transmission signals are sent toward the fill substance, their echo signals recorded and converted into an echo function, at least one echo characteristic of the echo function is determined, and based on the echo characteristics of at least one preceding measuring a prediction for the echo characteristics expected in the case of the current measuring is derived. The echo characteristics of the current measuring are determined taking into consideration the prediction, and based on the echo characteristics the current fill level is ascertained. This method comes close to an echo tracking in the broadest sense.

German Publication, DE 10 2004 052 110 A1 describes a sixth method, which improves the wanted echo detection by an echo evaluation and classification of the echos in the envelope curve.

This above described methods work without problem in a large number of applications. Problems occur, however, when there is some doubt as to the correctness of the identification of the echo coming from the fill level.

In the case of the first method, for example, measurement problems occur when installed objects are present in the container, and the installed objects reflect the transmission signals better than the surface of the fill substance.

In the case of the echo tracking according to the third method, measurement problems occur, when during operation the wanted echo runs over a disturbance echo and subsequently the disturbance echo is tracked as a wrong wanted echo. Furthermore, a problem occurs, when upon turn-on, the preceding wanted echo signal no longer agrees with the actual situation or the preceding wanted echo signal is not known.

Summarizing, in the case of fill level measuring devices, which operate according to the travel time measuring principle, for ascertaining the fill level, the raw envelope curve is recorded and the echos arising from reflections on the surface of the fill substance and on disturbing installed items, such as, for example, tubes, stirring blade, filling flows of the fill substance, deposits, etc., are ascertained. For simplifying and improving the evaluation, the raw envelope curve is preprocessed, whereby a reduction of the maxima present and a quieting of the measuring can be achieved. Used for this preprocessing of the echo function, or the envelope curve, are filter methods, or statistical methods.

Application of the filter method is problematic, when different behaviors of the filters are required in different measuring situations. If random disturbance echos occur, strong filtering is necessary, in order to suppress them.

In the case of rapidly changing fill levels, this strong filtering causes, however, a significant problem in that virtual artifact echos, so-called "ghost echoes", arise. These artifact echos can only be suppressed very difficultly and are interpreted by the evaluation software as possible fill-level echos. Due to this defective interpretation of an artifact echo as a fill-level echo, errors can arise in the fill level determination.

If mistakenly another echo, e.g. a disturbance echo, is classified as the fill-level echo, i.e. as wanted echo, of the fill substance in the container, there is the danger that a wrong fill level will be output. This can, depending on application, lead to overfilling of containers, to empty operation of pumps or other events possibly associated with considerable danger.

SUMMARY OF THE INVENTION

An object of the invention is to provide an improved, safe method for ascertaining wanted echo signals in measurement signals ascertained by means of a travel time measuring method.

This object of the invention is achieved by a method for ascertaining and monitoring fill level of a medium in a container by means of a field device using a travel time measuring method, wherein transmission signals are transmitted toward the medium and reflection signals received, wherein the received reflection signals are registered as echo signals in an echo function, or envelope curve, dependent on travel time or travel distance, wherein by means of an echo search algorithm at least one wanted echo signal is ascertained in the echo function, or in the envelope curve, wherein by means of at least one filter with filter parameters the echo function, or the envelope curve, is preprocessed, wherein at least a first filter range with a first width is predetermined at the position of the wanted echo signal in the echo function, or in the envelope curve, and at least three filter ranges are formed in the echo function, that is in the envelope curve.

Preferably, the echo function, or the envelope curve, is filtered by the filter with different filter parameters in the first filter range, in the second filter range and/or in the third filter range.

In an advantageous embodiment of the method of the invention, the echo function, or the envelope curve, is filtered by the filter in the first filter range, in the second filter range and/or in the third filter range individually and/or in certain regions.

In a special embodiment of the method of the invention, the echo function, or the envelope curve, is filtered by means of an asymmetric lowpass filter.

Alternatively or supplementally, it is provided that an echo function, or envelope curve, stored in a preceding measuring cycle is averaged with the current echo function, or envelope curve.

Especially, the filter range is predetermined with a width symmetrically around the position of the echo function, or the envelope curve.

In an alternative embodiment of the method of the invention, the filter range is predetermined with a width asymmetrically around the position of the echo function, or the envelope curve.

In a supplemental embodiment of the method of the invention, at least the filter range, i.e. its width, is adaptively adjusted to the changing position of the wanted echo signal in the echo function, or in the envelope curve.

In an additional embodiment of the method of the invention, the filter parameters are adaptively matched to the changing position of the wanted echo signal in the echo function, or in the envelope curve.

An advantageous embodiment of the method of the invention provides that the different filter parameters and/or at least the width of the first filter range are/is predetermined by the operator, or maintenance personnel, of the field device.

A preferred embodiment of the method of the invention provides that the different filter parameters and/or at least the width of the first filter range are adapted automatically by an adaptive algorithm in the case of occurrence of artifact echos or stochastic disturbance echos.

Advantages of the method of the invention for ascertaining and monitoring fill level of a medium in a container using a travel time measuring method including that the measurement certainty in the case of difficult applications and measuring situations and, thus, the availability of the measuring device is significantly increased, that the evaluation of the fill level markedly steadies, or is improved, and that a more flexible evaluation is possible using different filter ranges.

BRIEF DESCRIPTION OF THE DRAWINGS

Other details, features and advantages of the subject matter of the invention will become apparent from the following description with the associated drawing, in which preferred examples of embodiments of the invention are shown. In the examples of embodiments of the invention shown in the figures, for better overview and for simplification, elements, which correspond in their construction and/or in their function, are provided with equal reference characters. The figures of the drawing show as follows.

DETAILED DESCRIPTION

Figure 1:
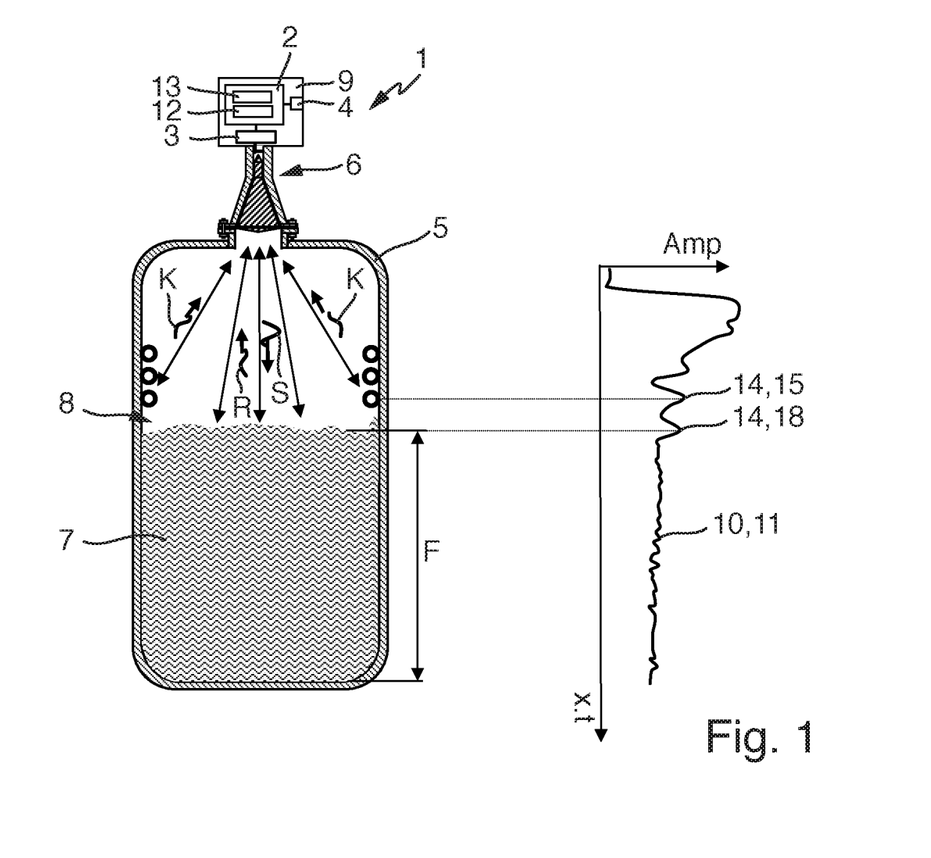
FIG. 1 is an example of an embodiment of a measuring device using the method of the invention for ascertaining fill level, together with a corresponding echo function.

FIG. 1 shows mounted on a container 5 on a nozzle, a measuring device 1 working according to the travel time measuring method for ascertaining the fill level F of a medium 7. Measuring device 1 includes a transmitting/receiving element 6 radiating freely into the process space and a measurement transmitter 9. Measurement transmitter 9 includes at least one transmitting/receiving unit 3, which cares for producing and receiving the measurement signals, a control/evaluation unit 4, which serves for signal processing of the measurement signals and for controlling the measuring device 1, and, moreover, a communication unit 2, which provides communication via a bus system as well as energy supply of the measuring device 1. Integrated into the control/evaluation unit 4 is, for example, a filter 12 for preprocessing the echo function 10, or the envelope curve 11, and an echo search algorithm 13 for evaluating the echo function 10, or the envelope curve 11, and for determining the wanted echo signal 15. Furthermore, there can be integrated in the control/evaluation unit 4 a memory element, in which measurement parameters, filter parameters FP, echo parameters, measuring factors, filter weighting factors and echo factors are stored. The transmitting/receiving element 6 is embodied in this example as a horn antenna. However, the transmitting/receiving element 6 can have any known antenna form, such as e.g. that of a rod or planar antenna. Produced in the transmitting/receiving unit 3 is a measurement signal, for example, in the form of a high-frequency transmission, or sent, signal S and radiated via the transmitting/receiving element 6 with a predetermined radiation characteristic in the direction of the medium 7. In a travel time t dependent on the traveled distance x, the transmission signals S reflected on the surface 8 of the medium 7 are received back by the transmitting/receiving element 6 and the transmitting/receiving unit 3 as reflection signal R. Then the control/evaluation unit 2 ascertains from the reflection signals R by means of the echo search algorithm 13 an echo function 10, or raw envelope curve, which shows the amplitudes of the echo signals 14 of the reflection signals R as a function of traveled distance x or the corresponding travel time t. Through an analog/digital conversion of the analog echo function 10, or the echo curve 10, a digitized envelope curve 11 is produced. Subsequently herein, only the terminology, echo function 10, will be used, wherein this terminology likewise implies the terms, echo curve 10, envelope function, or envelope curve 11.

An echo function 10 mapping the measuring situation in the container 5 is shown for the travel distance x of the transmission signal S. For better understanding, reference lines are associated with the corresponding echo signals 18 in the echo function 10, so that cause and effect can be readily appreciated. In the initial region of the echo function 10, the decay behavior, or the so-called ringing, is to be seen, which can arise due to multiple reflections or also from accretion formation in the transmitting/receiving element 6 or in the nozzle. The method of the invention is performable not only in freely radiating microwave measuring devices 1, such as explicitly shown in FIG. 1 but also in other travel time measurement systems, such as, for example, TDR measuring devices or ultrasonic, measuring devices.

In today's state of the art, there are different approaches for determining the exact position $x_1$ of the wanted echo signal 15 in the ascertained echo function 10 or the digital envelope curve 11. The exact ascertaining of the fill level F in the echo function 10 determines what accuracy of measurement can be achieved with this echo measuring principle under the given measuring conditions.

Figure 2:
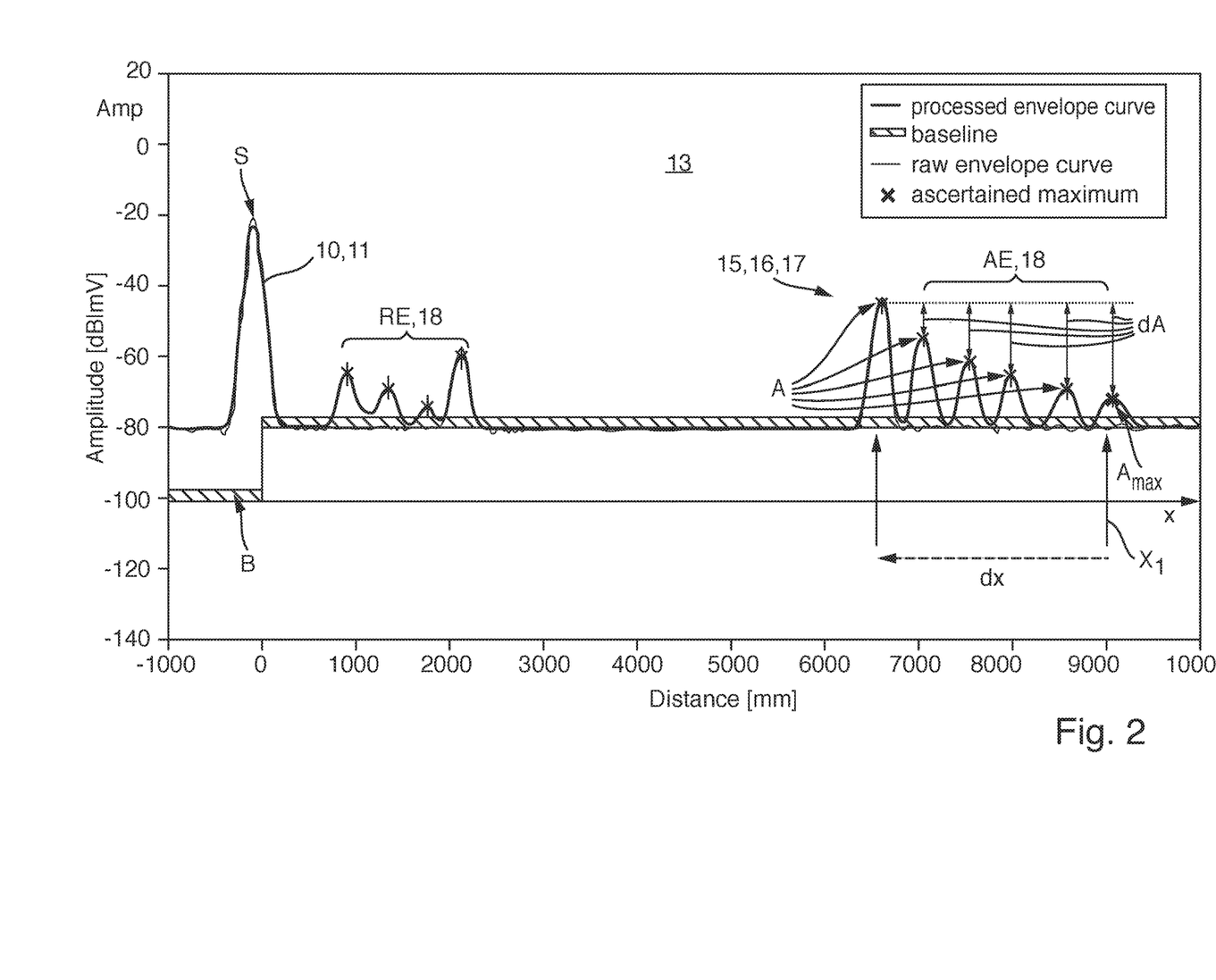
FIG. 2 is an echo function, or envelope curve, with a filter, which applies the same filter parameter set to the total measuring range.

A generally valid approach for determining the fill level from the echo function 10, or the envelope curve 11, is shown in FIG. 2. FIG. 2 shows the echo function 10, or the envelope curve 11, which was preprocessed with a filter, which applies the same filter parameter set to the total measuring range. Plotted on the abscissa is the required travel time t, or, in given cases, the traveled path x, of the measurement signal in the container 5, while the ordinate contains the amplitude values Amp of the echo function 10, or the envelope curve 11. The wanted echo signal 15 is determined by means of an echo search algorithm 13 according to the methods described in the introduction. In support of this, most often a baseline B is used as reference line.

Baseline B is ascertained, for example, by means of a static echo search algorithm, e.g. a mathematical filter function in the form of a sliding average value formation from the respective echo function 10 or an echo function 10 ascertained at start-up in the empty container 5. Baseline B is used for ascertaining the wanted echo signals 15 in the echo function 10, or the envelope curve 11. Accordingly, baseline B is used as reference line, or abort criterion, for the echo search algorithm 13 for wanted echo signals 15 in the echo function 10, or the envelope curve 11. As a result, it is possible to identify the wanted echo signals 15 in the echo function 10 by means of the baseline B. The signal fractions, which lie above the baseline B, are recognized by the static echo search algorithm 12 as wanted echo signals 15. In order to enable a stable evaluation by the echo search algorithm 13, the echo function 10, or the envelope curve 11, is preprocessed. Due to this preprocessing, a reduction of the present disturbance echo signals 18 and a steadying of the total measuring by the echo search algorithm 13 can be achieved. For this, an asymmetric statistical method, or an asymmetric filter method, is applied, wherein at least two echo functions 10, that is envelope curves 11 ascertained in different measuring cycles, are averaged. In this way, random echo signals RE can be suppressed. Also, jiggles in the echo amplitudes A, Amax can be cancelled by the asymmetric statistical method, or asymmetric filter method.

The echo function 10, or the envelope curve 11, includes due to the very strong, "one-size-fits-all" filtering by the filter 12 over the total measuring range some disturbance echo signals 18. The application of the asymmetric statistics is problematic, when different filter behaviors are required. In case random disturbance echo signals RE occur, a strong action of the statistics, or filtering, is necessary, in order that these stochastic echo signals RE be suppressed. In turn, this strong action of the filtering, or statistics, causes in the case of rapidly changing fill levels F of the medium 7 in the container 5 a significant measurement problem, since virtual, artifact echos AE, so-called "ghost echoes", are produced. Due to these artifact echo signals AE, the echo search algorithm 13 can incorrectly identify such an artifact echo signal AE as wanted echo signal 15 and, thus, ascertain a wrong measured value for the fill level F. Basically, as soon as the fill level F of the medium 7 in the container 5 moves rapidly, a strong action of the filtering, or the statistics, is undesirable. FIG. 2 shows the artifact echos AE, which can arise in the case of a fast positional change dx of the wanted echo signal 15 due to the fast change of the fill level F from 9000 mm to 6700 mm. These artifact echos AE arise from the time delay in the statistical method, or filter method.

Figure 3:
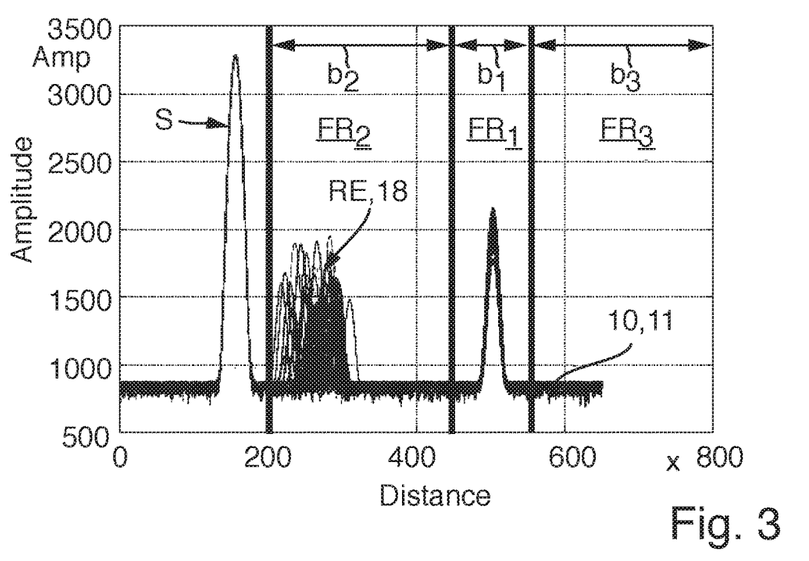
FIG. 3 is an echo function family, or envelope curve family, with different filter ranges, wherein the filter applies the same filter parameter set to all filter ranges.

According to the invention, a range-dependent filter method, or statistical method, for preprocessing the echo function 10, or the envelope curve 11, is applied. For this, such as shown in FIG. 3, the echo function 10, or the envelope curve 11, is divided into at least three filter ranges $FR_1$, $FR_2$, $FR_3$. Thus, at the position $x_1$ of the wanted echo signal 15 ascertained in the preceding measuring cycle, a first filter range $FR_1$ with a first window width $w_1$ is specified. From this specification of the first filter range $FR_1$ around the position $x_1$ of the wanted echo signal 15, the second filter range $FR_2$ with a second width $w_2$ toward the transmission signal S and the third filter range $FR_3$ with a third width $w_3$ implicitly adjoin. FIG. 3 shows the family of curves of the echo function 10, or the envelope curve 11, of the different measuring cycles, over which is averaged. The different disturbance echo signals 18 are shown as random echo signals RE. The second filter range $FR_2$ is symmetrically or asymmetrically formed with a second width $w_2$ around the position $x_1$ of the wanted echo signal 15 from a preceding measuring cycle. The second width $w_2$ of the second filter range $FR_2$ is adaptively adjusted to the changing position of the wanted echo signal in the echo function 10, or in the envelope curve 11. Furthermore, the different filter parameters FP and/or at least the width $w_1$ of the first filter range $FR_1$ can be automatically matched by a matching algorithm in the case of occurrence of artifact echos AE or stochastic disturbance echos RE, so that the filter method, or statistical method, automatically adjusts and is neural or self-learning. The filter parameters FP can be matched adaptively to the changing position x1 of the wanted echo signal 15 in the echo function 10, or in the envelope curve 11. For this, there can be stored in the memory unit of the control/evaluation unit 2 corresponding sets of filter parameters FP, which are loaded according to corresponding criteria, such as, for example, the position $x_1$ of the wanted echo signal 15. Alternatively or supplementally, the different filter parameters FP and/or at least the width $w_1$ of the first filter range $FR_1$ can be predetermined by the operator, or maintenance personnel, of the field device 1.

Figure 4:
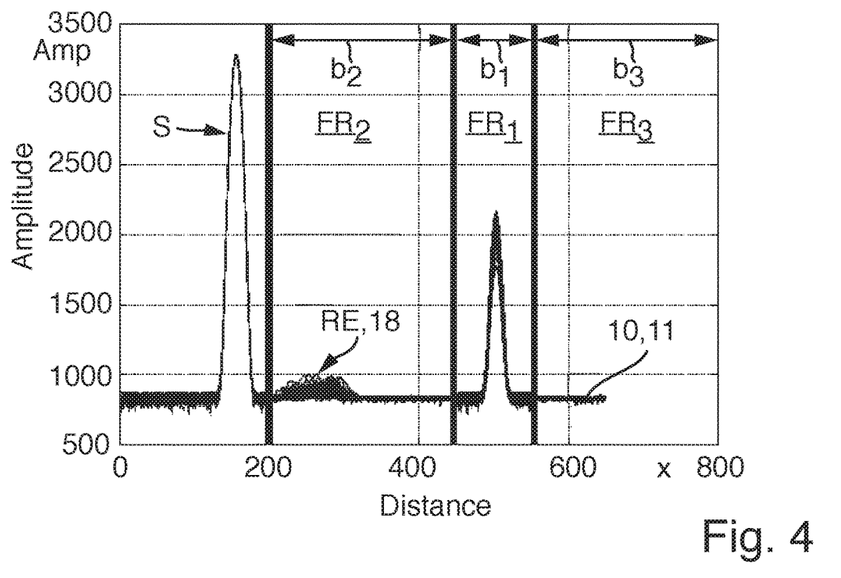
FIG. 4 is an echo function family, or envelope curve family, with different filter ranges, wherein the filter applies different filter parameter sets in the filter ranges.
Figure 5:
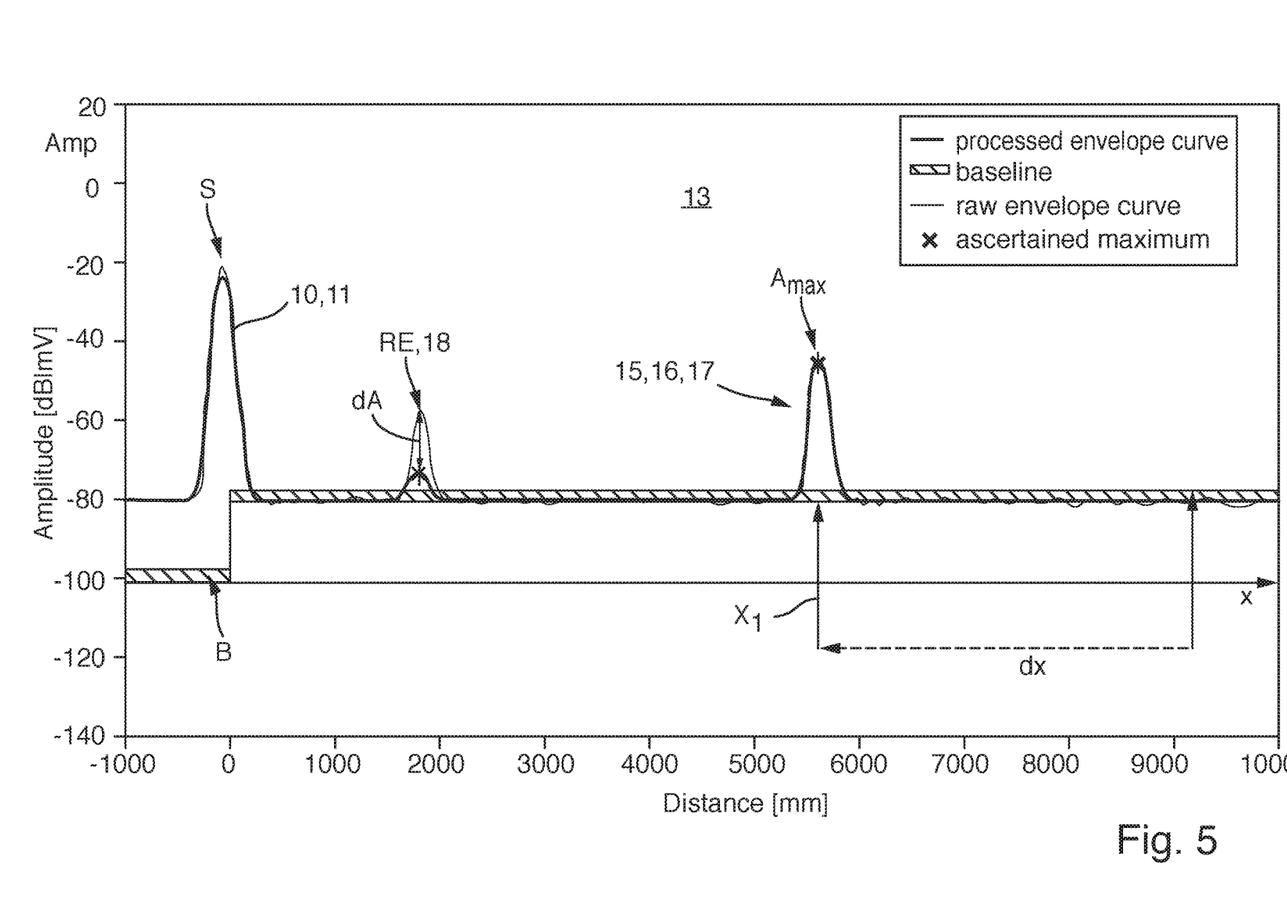
FIG. 5 is an echo function, or envelope curve, with a filter, which applies different filter parameter sets to the total measuring range.

Due to this three part division of the measuring range into at least three filter ranges of the echo function 10, or the envelope curve 11, different filter parameters FP, or filter criteria, can be applied for the individual filter ranges $FR_1$, $FR_2$, $FR_3$. This different filtering, or averaging, in the three filter ranges $FR_1$, $FR_2$, $FR_3$ is shown in FIG. 4. Evident in FIGS. 4 and 5 is that through this different filtering, or statistics, in these filter ranges $FR_1$, $FR_2$, $FR_3$, the suppressing of the stochastic disturbance echos in the second filter range $FR_2$ is achieved by means of a strong filtering and the prevention of the artifact echo signals AE in the third filter range FR3 is achieved by means of a weak filtering. Due to the division of the echo function 10, or the envelope curve 11, into filter ranges $FR_1$, $FR_2$, $FR_3$ and the therewith associated opportunity to supply different sections of the echo function 10, or the envelope curve 11, with different filter parameters FP, or statistical parameters, it is possible to ascertain the moved fill level F without the formation of artifact echos AE. Despite the randomly arising disturbance echos RE, which, in fact, can be suppressed by means of a strong filtering, also, a short-term dimpling of the echo amplitude Amax of the wanted echo signal 15 can be cancelled by an asymmetric statistical method, that is filter method.

In the envelope curve statistics of the invention, the echo functions 10, or the envelope curve 11, are pointwise time averaged in subsequent measuring cycles. This averaging is done by a filter 12 with exponential weighting factors. In this way, positive and negative signal contributions are differently weighted. Depending on whether the value of the envelope curve 11 of the last measuring was larger or smaller than the corresponding value of the current envelope curve 11, different weighting parameters are used. This method is referred to as "asymmetric envelope curve statistics" or an asymmetric filter method. The averaging is performed, for example, by a lowpass filter 12 with corresponding filter parameters FP. Due to this averaging, or filtering, a reduction of the number of echos and an improvement of the signal to noise ratio are achieved. Furthermore, fluctuations of the echo amplitude A are cancelled. The averaging result is stored in the memory element in the control/evaluation unit 2 as a parameter. In the case of these asymmetric envelope curve statistics, for the average calculation by the filter, echo curve values 11 rising and falling as a function of time are differently weighted, so that for each envelope curve point 11 an appropriate weighting factor is present. These weighting factors can be stored in the memory element in the control/evaluation unit 2. The selection of smaller weighting factors for falling values of the envelope curve 11 permits the echo amplitude A to stay high and fluctuations in the echo amplitudes A are canceled.

FIG. 5 shows such an echo function 10, or envelope curve 11, with a filter 12, which applies different filter parameter sets FP to the total measuring range, or filter ranges FR1, FR2, FR3. FIG. 5 also shows a fast positional change dx of the wanted echo signal 16 resulting from a corresponding change of the fill level F in the container 5, yet, because of the weaker filtering of the echo function 10, or the envelope curve 11, the occurrence of artifact echos AE in the first filter range FR1 are prevented. If one compares the echo functions 10, or the envelope curves 11, of FIG. 2 and FIG. 5, the advantages of the range-dependent filtering of the invention, or averaging by means of an asymmetrical filter method, or by means of an asymmetric statistical method, are readily apparent. The disturbance echo signals 18 of stochastic echo signals RE and artifact echos AE are prevented by the method of the invention.

The invention claimed is:
1. A method for ascertaining and monitoring fill level (F) of a medium in a container by means of a field device using a travel time measuring method, comprising the steps of:
transmitting transmission signals (S) toward the medium and receiving reflection signals (R);
registering the received reflection signals (R) as echo signals in an echo function, or envelope curve, dependent on travel time (t) or travel distance (x);
filtering by means of at least one filter with filter parameters (FP) the echo function, or the envelope curve;
wherein:
at least three filter ranges ($FR_1$, $FR_2$, $FR_3$) are formed in the echo function, or the envelope curve, and at least a first filter range ($FR_1$) with a first width ($w_1$) is predetermined at the position ($x_1$) of the wanted echo signal in the echo function or the envelope curve ascertained in a preceding measuring cycle;
the echo function, or the echo curve is filtered by the filter with different filter parameters (FP) in the first filter range ($FP_1$), in the second filter range ($FP_2$) and/or in the third filter range ($FP_3$); and
the second filter range and the third filter range adjoin in front or behind the first filter range;
ascertaining by means of an echo search algorithm at least one wanted echo signal in the echo function, or the envelope curve; and ascertaining the fill level (F) in the basis of position (x1) of the wanted echo signal.

2. The method as claimed in claim 1, wherein the echo function, or the envelope curve, is filtered by the filter in the first filter range ($FR_1$), in the second filter range ($FR_2$) and/or in the third filter range ($FR_3$) individually and/or in certain regions.

3. The method as claimed in claim 1, wherein the echo function, or the envelope curve, is filtered by means of an asymmetric lowpass filter.

4. The method as claimed in claim 1, wherein an echo function, or envelope curve, stored in a preceding measuring cycle is averaged with the current echo function, or envelope curve.

5. The method as claimed in claim 1, wherein the filter range ($FR_1$) is predetermined with a width ($w_1$) symmetrically around the position ($x_1$) of the echo function, or envelope curve.

6. The method as claimed in claim 1, wherein the filter range ($FR_1$) is predetermined with a width ($w_1$) asymmetrically around the position ($x_1$) of the echo function, or the envelope curve.

7. The method as claimed in claim 1, wherein at least the filter range ($FR_1$), and/or its width ($w_1$), is adaptively adjusted to the changing position ($x_1$) of the wanted echo signal in the echo function, or in the envelope curve.

8. The method as claimed in claim 1, wherein the filter parameters (FP) are adaptively matched to the changing position ($x_1$) of the wanted echo signal in the echo function, or in the envelope curve.

9. The method as claimed in claim 1, wherein the different filter parameters (FP) and/or at least the width ($w_1$) of the first filter range ($FR_1$) are predetermined by the operator, or maintenance personnel, of the field device.

10. The method as claimed in claim 1, wherein the different filter parameters (FP) and/or at least the width ($w_1$) of the first filter range ($FR_1$) are adapted automatically by an adaptive algorithm in the case of occurrence of artifact echos (AE) or stochastic disturbance echos (RE).

\* \* \* \* \*